(12) United States Patent
Rising et al.

(10) Patent No.: US 6,325,096 B1
(45) Date of Patent: Dec. 4, 2001

(54) VARIABLE ORIFICE VALVE

(75) Inventors: Donald Rising; John F. Zettler, both of Stow, MA (US)

(73) Assignee: Stargaze Corporation, Braintree, MA (US)

(*) Notice: Subject to any disclaimer, the term of this patent is extended or adjusted under 35 U.S.C. 154(b) by 0 days.

(21) Appl. No.: 09/426,044

(22) Filed: Oct. 25, 1999

Related U.S. Application Data

(60) Provisional application No. 60/141,041, filed on Jun. 24, 1999.

(51) Int. Cl.[7] .............................. F16K 3/00; G05D 7/06
(52) U.S. Cl. .................................. 137/454.2; 137/487.5; 251/129.11; 251/212; 251/901
(58) Field of Search ............................ 137/454.2, 487.5; 251/129.11, 212, 901

(56) References Cited

U.S. PATENT DOCUMENTS

| | | | |
|---|---|---|---|
| 2,307,273 | * | 1/1943 | Hughes ............................ 251/212 |
| 2,810,394 | * | 10/1957 | Ferguson ...................... 251/212 X |
| 3,787,022 | * | 1/1974 | Wilcox .............................. 251/212 |
| 3,799,191 | * | 3/1974 | Burkhardt et al. ............. 137/454.2 |
| 4,094,492 | * | 6/1978 | Beeman et al. ................... 251/212 |
| 4,576,201 | * | 3/1986 | Guggenheim ................ 251/901 X |
| 4,798,521 | * | 1/1989 | Schmidt et al. ............ 137/487.5 X |

FOREIGN PATENT DOCUMENTS

| | | | |
|---|---|---|---|
| 23 43 074 | * | 3/1975 | (DE) ................................. 251/901 |
| 34 34 696 | * | 4/1986 | (DE) ................................. 251/212 |

* cited by examiner

*Primary Examiner*—Gerald A. Michalsky
(74) *Attorney, Agent, or Firm*—Mirick, O'Connell, DeMallie & Lougee, LLP

(57) ABSTRACT

A variable orifice valve for controlling fluid flow in a conduit, comprising a band or other movable members defining an opening for passing the fluid therethrough, the band mounted transverse to the direction of fluid flow in the conduit, so that the band opening is at least partially in the conduit. The band is movable relative to the conduit, to change the amount of the opening exposed to fluid flow.

21 Claims, 14 Drawing Sheets

VARIABLE ORIFICE VALVE

This application claims benefit of provisional application Ser. No. 60/141,041, filed Jun. 24, 1999.

FIELD OF THE INVENTION

This invention relates to a variable orifice valve which is most useful for gas handling systems that require a low pressure drop on the order of up to 5 inches of water, and is particularly useful for vacuum systems that require an extremely low pressure drop across the vacuum control valve.

BACKGROUND OF THE INVENTION

There are innumerable industrial processes that require control of air flow in a duct. Such control is provided in part by valves. For low pressure vacuum systems, fine control is needed. Currently available valves, and valve systems including valve controllers, are inadequate in many respects.

Ideally, such valves create when open little or no restriction in the duct. However, rotatable vane-type valves, and piston-type valves each create very substantial restrictions (and thus pressure drop across the valve) even when fully open. Such is unacceptable for many applications.

In addition, such valves should operate as quickly as possible in order to prevent pressure fluctuations that can affect air flow upstream of the valve, and their operation should preferably be linear, which simplifies and speeds their control. Butterfly valves have a very non-linear relationship between position and open area, and are relatively slow to operate. These issues are particularly critical in applications that require constant, controlled air flow in an industrial process. One example of such is the fine control of air flow required in a semiconductor wafer resist coating operation; the air flow in part defines the quality of the resist coat, so the aim is to keep the air flow constant. However, perturbations in the vacuum system downstream of the resist coating chamber cause pressure fluctuations that propagate upstream to the chamber, thus disturbing the air flow. It is thus an aim in such systems to have a valve, and air control system using such valve, that creates essentially zero pressure drop when fully open, and provides for fine and nearly instantaneous control of the valve orifice size, to prevent downstream pressure perturbations from propagating upstream past the valve, and thus affect the flow of air in a resist coating chamber located upstream of the valve.

SUMMARY OF THE INVENTION

It is therefore the primary object of this invention to provide a fluid control valve, and system using such valve, that provides very fast, either essentially linear or tailored response, and is adjustable from a fully open position in which it creates virtually no restriction in the fluid duct, to a fully closed position in which the duct is essentially closed.

The invention features in one embodiment a valve comprising a band with opposed openings. As the band is moved, the overlap of the opposed openings changes to vary the orifice created by such overlap. Alternatively, the band can be replaced by members, each defining an opening, which are movable cooperatively, transversely to the fluid flow, to vary the orifice area created by the overlapping openings. In an alternative embodiment, the valve comprises two or more valve leaves which together defamed the orifice, and are cooperatively pivoted by a single drive system in order to accomplish the variable orifice.

Featured herein is a variable orifice valve for controlling fluid flow in a conduit, comprising: two or more movable members (such as vanes or portions of a band which together define an opening for passing the fluid therethrough; means for mounting the members transverse to the direction of fluid flow in the conduit, so that the opening is at least partially in the conduit; and means for moving the members relative to the conduit, to change the amount of the opening (the orifice size) exposed to fluid flow.

When the members define band portions, the band may have two openings, which may be selectively overlapping. Preferably, one opening is downstream of the other opening. The means for moving may include a first roller outside and on one side of the conduit, and a second roller outside and on the other side of the conduit. The band is preferably wrapped at least partially around each such roller. The means for moving may further include means for rotating the first roller to change the relative positions of the openings. The means for rotating the first roller may include a drive motor which drives the periphery of the first roller. The valve may further include idler rollers proximate each of the first and second rollers, and around which the band is partially wrapped.

The openings define an orifice shape having approximately the same circumferential shape as the duct, so that the valve when fully open presents little or no restriction in the duct. For a circular duct, the orifice is preferably generally circular. Preferably as well, the band has two ends, and both ends are fixed to the first roller. The band may be virtually continuous, and wrapped most of the way around each roller. The means for rotating may rotate the first roller so that any portion of the band which is located within the duct does not touch the first roller.

The band may include a relatively stiff portion located in the conduit, and may further include a relatively flexible portion located outside of the conduit. The valve may further include means for determining the position of the band (and thus the openings) relative to the conduit. The movable members may be housed in a valve cartridge which is removably held in a valve housing. In this arrangement, the means for moving the members may itself be movable relative to the housing, so that it can be disengaged from the cartridge to facilitate cartridge removal.

The valve system may further include means for determining the fluid pressure in the conduit at a first location upstream of the band. The means for moving may be responsive to this means for determining fluid pressure. The valve system may further include means for sensing the fluid pressure at a second location upstream of the first location. The valve system may still further include means for establishing a fluid pressure set point. The means for moving may be further responsive to the means for sensing and the means for establishing a fluid set point.

Featured in another embodiment is a variable orifice low pressure gas flow control valve for controlling fluid flow in a conduit, comprising: a drive roller; a tensioning roller; an at least partially flexible band defining two openings which are aligned within the conduit in a valve fully open position, the band being at least partially wrapped around both the drive and tensioning rollers, the portions of the band proximate the openings lying very close together in the conduit, to minimize fluid leakage past the band that is not through the openings; and means for rotating the drive roller to move the band and thus change the relative overlap of the two to openings, to thereby change the orifice size.

Featured in yet another embodiment is a variable orifice gas flow control system for maintaining a relatively constant gas flow at a control location in a vacuum system, comprising: means for establishing a pressure set point; a variable orifice valve in the vacuum system, the valve having a movable band spanning the vacuum system, and defining an opening with an open area which is variable by movement of the band; means for determining the pressure at two spaced locations of the vacuum system, a first location proximate the control location, and the second location proximate and upstream of the valve; and means, responsive to the pressure set point and the two determined pressures, for moving the band to drive the pressure at the first location toward the pressure set point.

In still another embodiment, this invention features a variable orifice valve for controlling fluid flow in a conduit, comprising: a first member mounted at least partially in the conduit, and defining a first opening; a second member mounted at least partially in the conduit proximate the first member, and defining a second opening; and means for moving the first and second members cooperatively, transversely to the fluid flow in the conduit, to vary the overlap of the first and second openings and thereby vary the orifice area.

The valve system of this invention has a very small width footprint, which decreases the duct length necessary to accommodate the valve. Additionally, the valve cartridge concept allows a valve to be replaced very easily, thus decreasing maintenance costs and system down time, both key issues in chip fabrication operations. Also, this allows a single valve system to accommodate more than one type and/or size of orifice. Another advantage is that positive indexing between the drive and valve is not required (due to the feedback control), which simplifies the valve construction and maintenance. However, if it is desirable to know the true position of the valve band or valve vanes, an existing type of position indicating means (such as a Hall-effect sensor system) could easily be employed. Still another advantage of the inventive valve system is that the orifice can be opened to substantially 100% of the duct opening, and can be virtually fully closed, as desired. These features are particularly desirable in low pressure drop applications such as in vacuum systems.

BRIEF DESCRIPTION OF THE DRAWINGS

Other objects, features and advantages will occur to those skilled in the art from the following description of the preferred embodiments, and the accompanying drawings, in which.

DETAILED DESCRIPTION OF THE PREFERRED EMBODIMENTS

This invention may be accomplished in a variable orifice valve for controlling fluid (gas or liquid) flow in a duct, including a band (or separate members) defining at least two openings or partial openings, along with means for mounting the band (or members) transverse to the direction of fluid flow in the conduit with the openings at least partially in the conduit, and at least partially overlapping when the valve is not fully closed, the overlapping openings defining a fluid-passing orifice located in the duct. Also included are means for moving the band (or members) relative to the conduit, to change the orifice size. The term "member" can include a portion of a band defining an opening (or portion thereof), even though the "member" in this case can be an integral part of the band.

References herein to "front" and "back" or to "front" and "rear" are for descriptive purposes only and are not meant to indicate that a particular side of the valve must face upstream.

Figure 1:
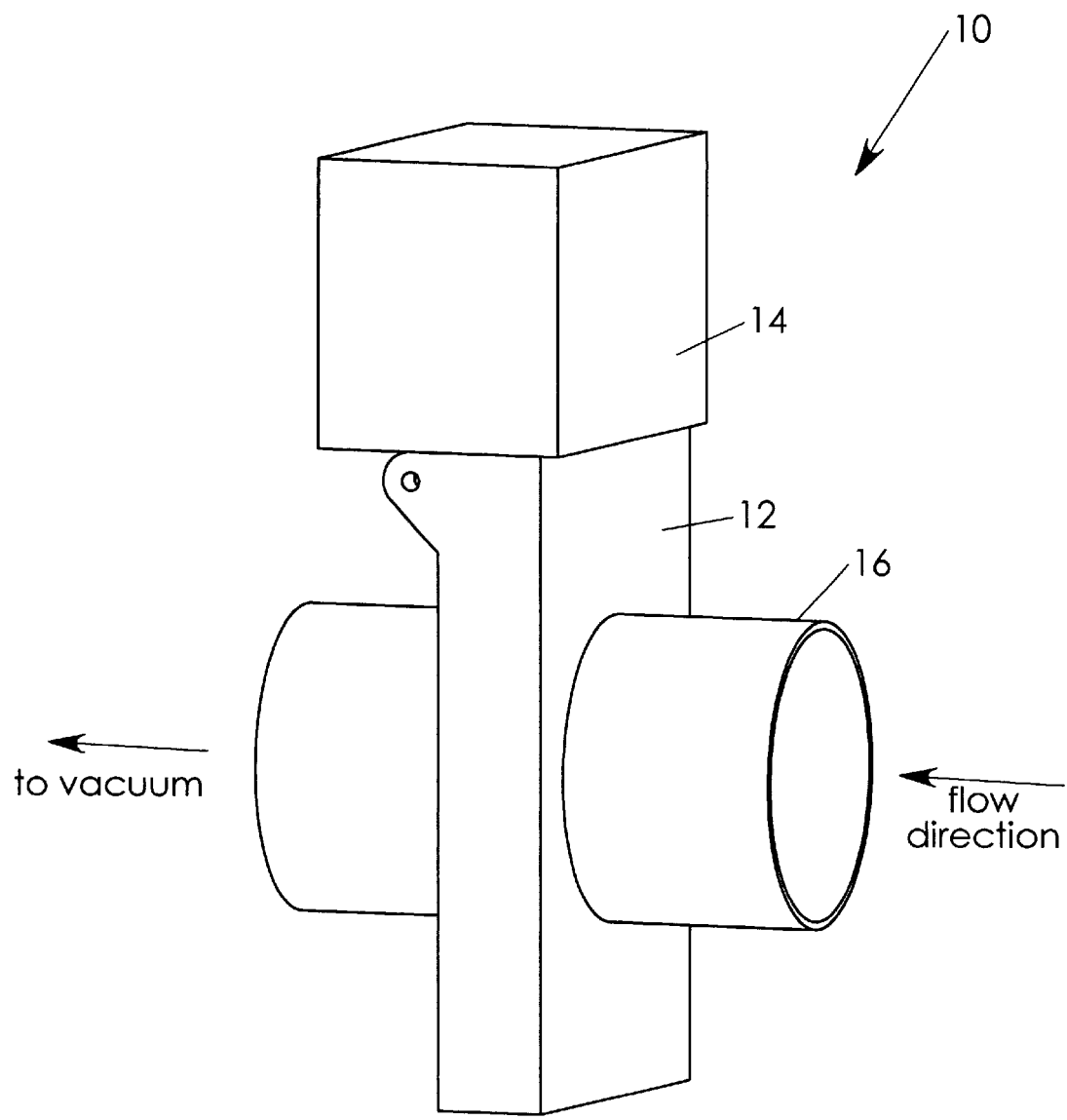
FIG. 1 is a schematic diagram of a variable orifice valve of this invention.
Figure 2A:
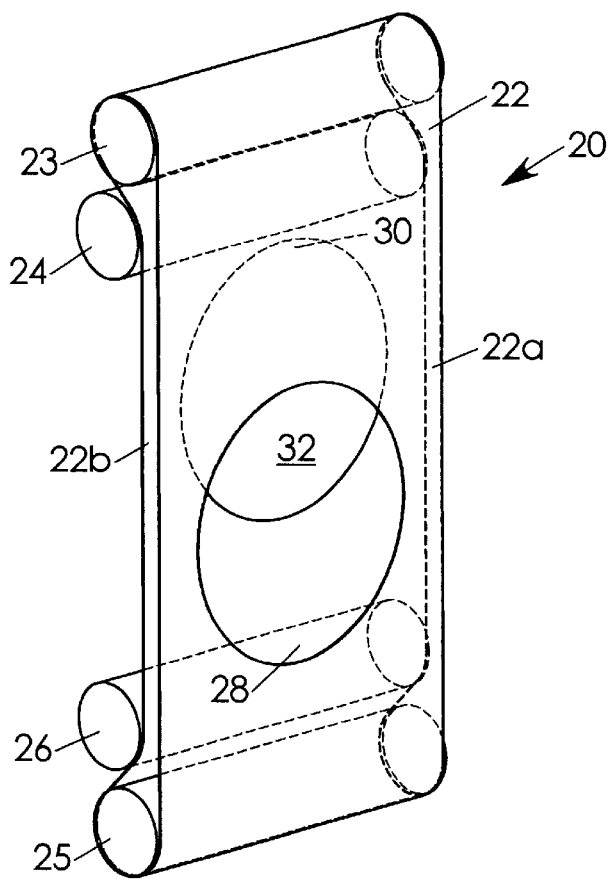
FIGS. 2A and 2B are simplified schematic and cross-sectional views, respectively of an embodiment of the valve cartridge of the valve of this invention.
Figure 2B:
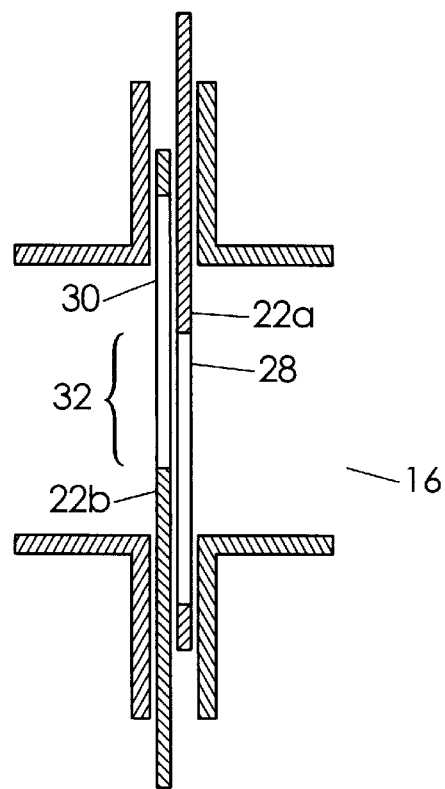

Variable orifice valve 10 of this invention, FIG. 1, includes a valve housing 12 and valve cartridge 20 (FIG. 2). Valve housing 12 is placed in fluid/gas/vacuum line 16. Valve actuator drive unit 14 controls the movement of the valve to accomplish a desired orifice. In this embodiment, the variable orifice is preferably accomplished as shown schematically in FIG. 2. Valve cartridge 20 includes valve band 22 having front side 22a and back side 22b. Valve band 22 defines opening 28 in front side 22a, and opening 30 in back side 22b. The position of band 22 relative to the duct is controlled to create a desired overlap between these two openings, thus creating gas orifice 32 having an appropriate size. Although carrying the movable members in a valve cartridge is the preferred embodiment of the invention, it is not a limitation. There are many manners in which the movable members can be properly held relative to the duct in order to accomplish their function.

Band 22 can be made of a desired material having sufficient flexibility, stiffness and chemical resistance, as needed for the particular application. In one application, in which the valve is used in an exhaust line for computer chip resist processing chambers (in which the exhaust gas is about 99.9% air, and 0.1% waste), the valve band material may be polyester film. Band 22 is partially wrapped around rollers 23 and 25, and rollers 24 and 26 act as idlers to cause the two sides of the band to lie very close to one another (preferably touching) in the area of orifice 32, to inhibit gas leakage around the orifice.

Figure 3A:
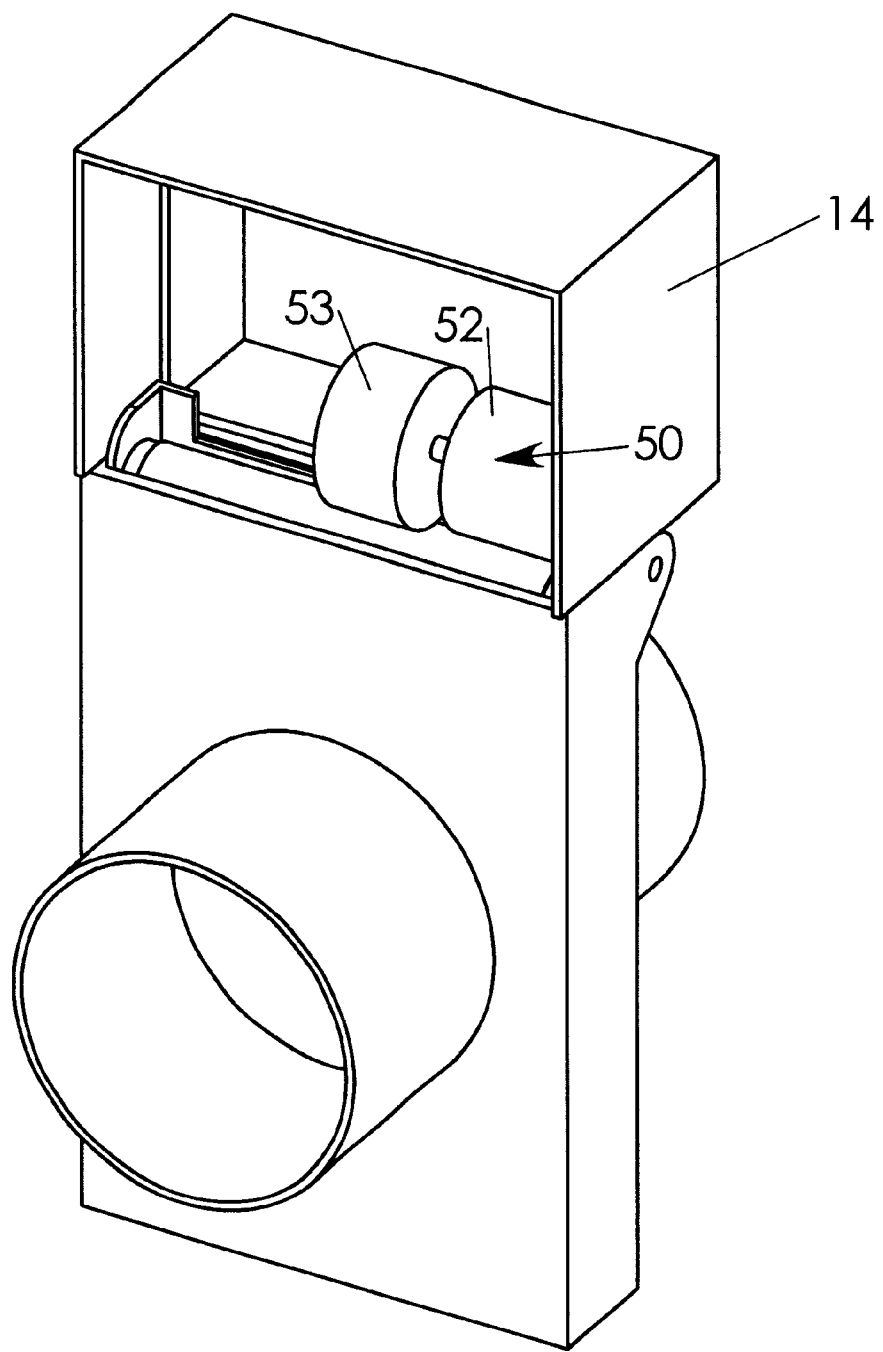
FIG. 3A is a schematic detail of one embodiment of the valve actuator drive unit of the valve of FIG. 1.

Band 22 may be moved by a drive means 50, FIG. 3A, carried by valve actuator drive unit 14. This allows the valving portion of the system to be made as a cartridge which can be replaced as needed to provide a new or different band. Actuator drive means 50 preferably includes actuator drive motor 52 which drives the band directly, or drives the actuator drive wheel or gear 53, which in turn drives roller 23. Actuator drive unit 14 pivots on pivot 51 (FIG. 3B) on valve housing 12, thus disengaging the drive from the valve cartridge, to provide access to valve cartridge 20.

Figure 3B:
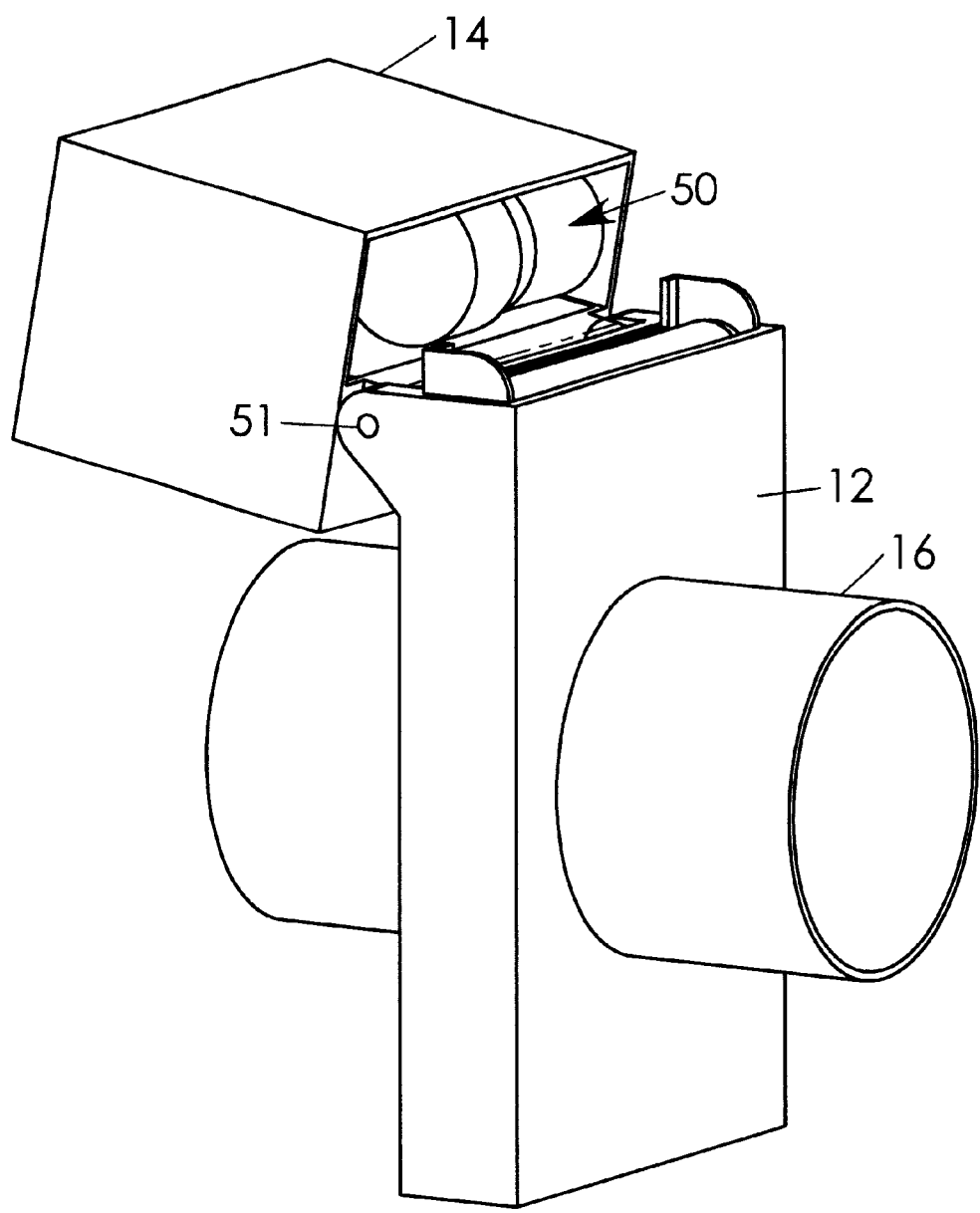
FIG. 3B is a similar view, with the valve actuator unit pivoted away from the valve cartridge to allow the cartridge to be removed.
Figure 4A:
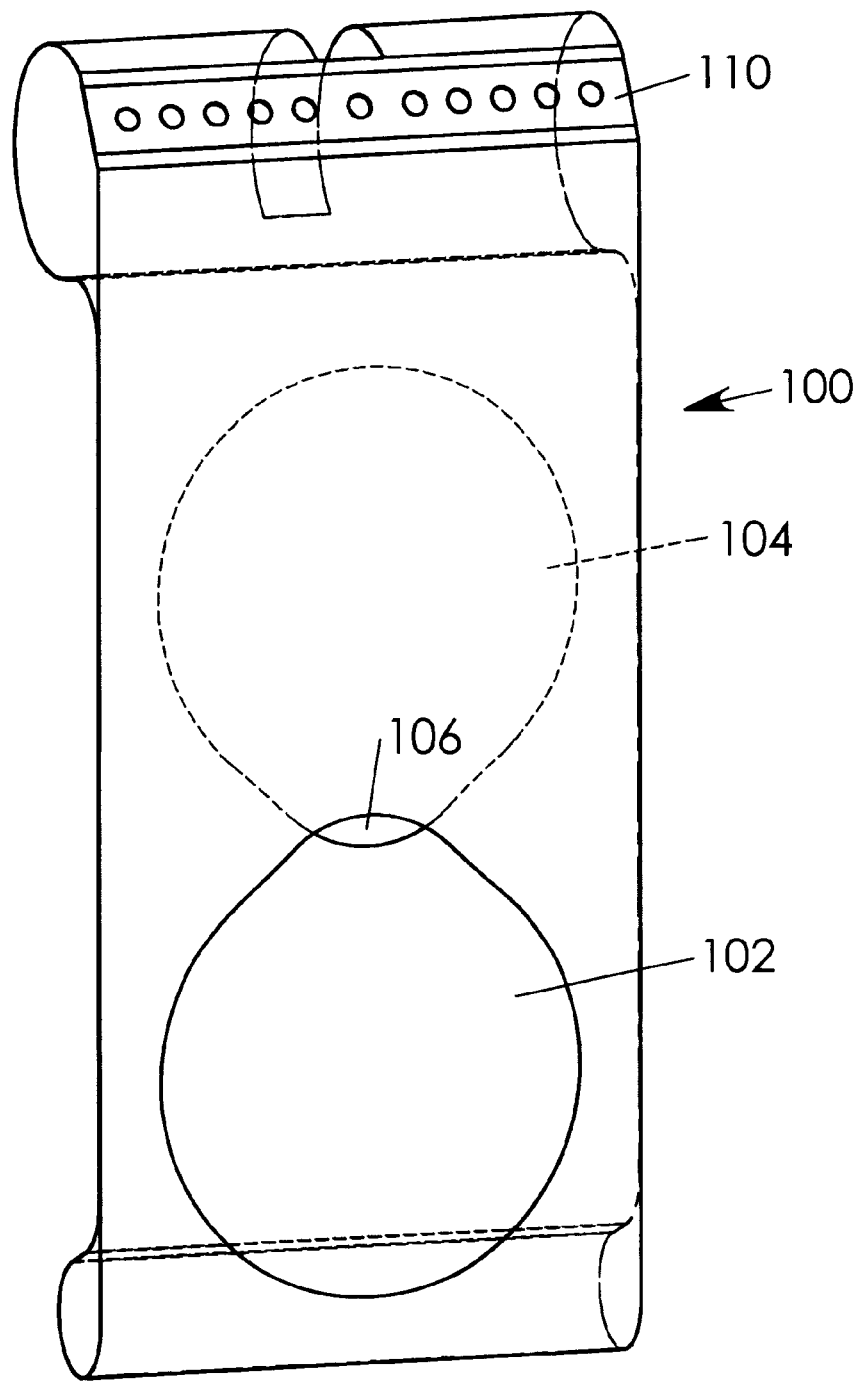
FIG. 4A is a schematic view of the preferred band of the valve cartridge for this invention.
Figure 4B:
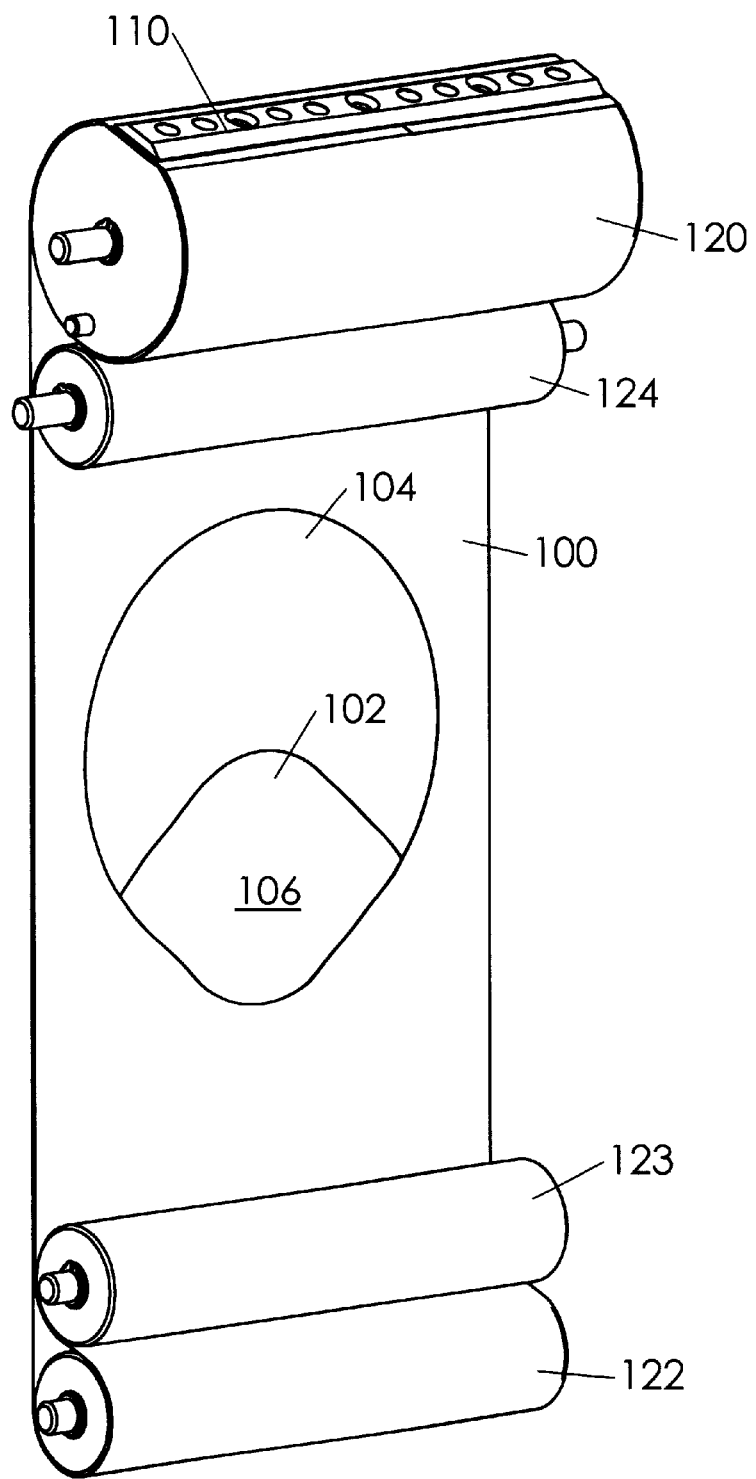
FIG. 4B is a rear view of the preferred embodiment of band and rollers of the valve cartridge of this invention, using the band of FIG. 4A.
Figure 5:
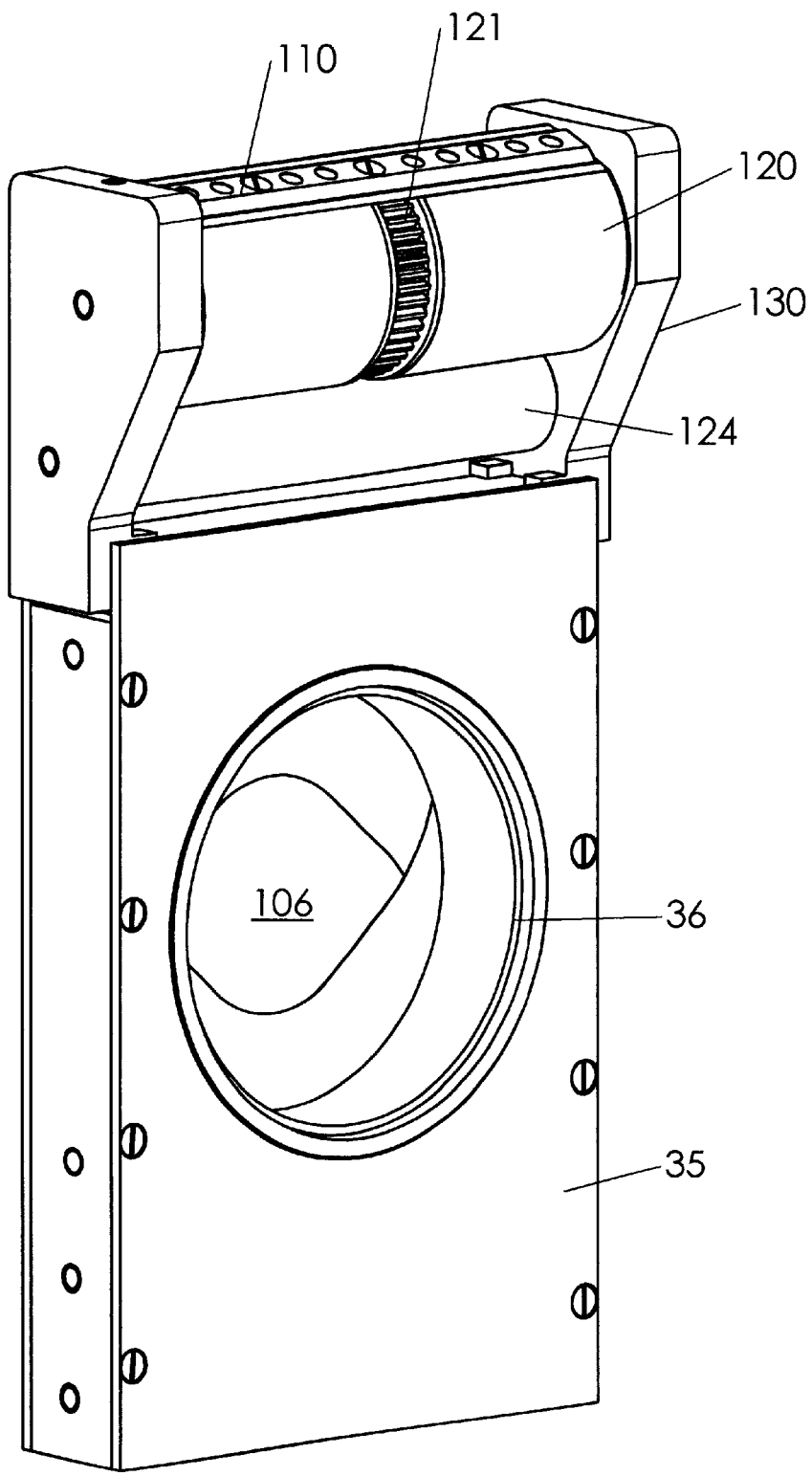
FIG. 5 is a detailed view of an embodiment of the valve cartridge using the band and rollers of FIG. 4B.

Shown in the drawings are two of many possible embodiments of a valve cartridge 20, FIG. 3B, suitable for this invention. Cartridge 130, as shown in FIG. 5, comprises a valve cartridge housing carrying rollers 120, 122, 123, and 124, (FIG. 4B) over which band 100 (FIG. 4A) is wound. Band 100 defines openings 104 and 102, the overlap of which creates fluid-passing orifice 106. Driven roller 120 carries drive teeth 121 for a positive, non-slip drive. Band 100 in this embodiment is not continuous (but is essentially so), and its two ends are held to roll 120 by member 110.

The valve band can take a number of configurations. For increased strength or wear resistance, the band portions which define the orifice can be made of or carry a stiff material which is fixed to a flexible material which rides over the rollers. Preferably, the arrangement is such that the portions of the band which can enter the duct never touch a roller, to prevent contamination of the rollers. This also allows the orifice-defining portions of the band to be inflexible, or insufficiently flexible to be rolled around a roller, as desired for a particular application of the valve.

As an alternative to a band, the invention can use other means of accomplishing overlapping openings to create a variable orifice. For example, two or more sliding or pivoting members such as vanes (shown below) or plates (not shown in the drawings) could be used instead of a band, each such movable member defining an opening. The vanes or plates would circumscribe or span the duct and be cooperatively translated toward or away from the center of the duct in order to accomplish a desired orifice. This movement could be accomplished with a single drive means driving the movable members together, or by mechanically linking the movable members, so that as one was driven, the others were as well. Two vanetype alternatives to a band are shown in FIGS. 9 and 10, and will be described below.

Valve cartridge housing front member 35 defines circular opening 36 which is aligned with the gas duct. (The opening obviously should have essentially the same cross sectional shape as the duct) As band openings 102 and 104 are moved from an aligned position (valve fully open), to a fully misaligned position (valve closed), the orifice decreases in size. An essentially fully closed state is shown in FIG. 4A, and a partially open state is shown in FIG. 4B. The orifice creating openings can be of a desired size and shape to create a desired orifice, and a desired variation in orifice area as the portions carrying the openings move relative to one another, which consequently changes the orifice shape and area. One of virtually innumerable such variations is shown in FIGS. 4A and 4B, in which opening 102 is generally circular, and essentially teardrop shaped. The two openings need not be the same shape or size. The shape and size of the band openings are thus arbitrary, and can be chosen to create a desired band transfer function. For the band openings shown in FIGS. 4A and 4B, there is virtually a direct relationship between the band movement and the percent open area, which creates an almost linear gain, which in turn greatly simplifies the feedback control system shown in FIG. 11.

Figure 6:
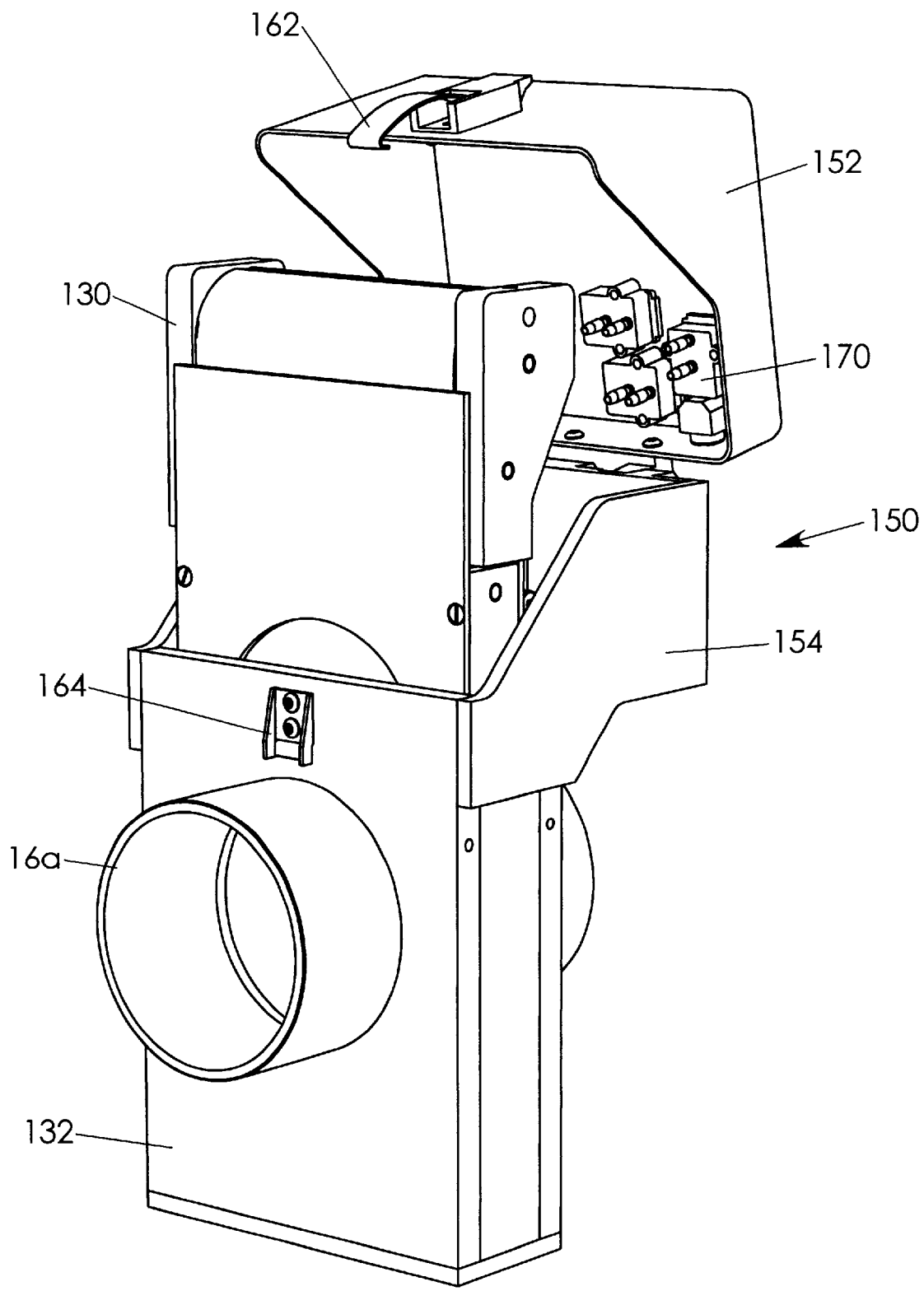
FIG. 6 is a view of the valve cartridge of FIG. 5 partially inserted into the cartridge housing for this embodiment.
Figure 7:
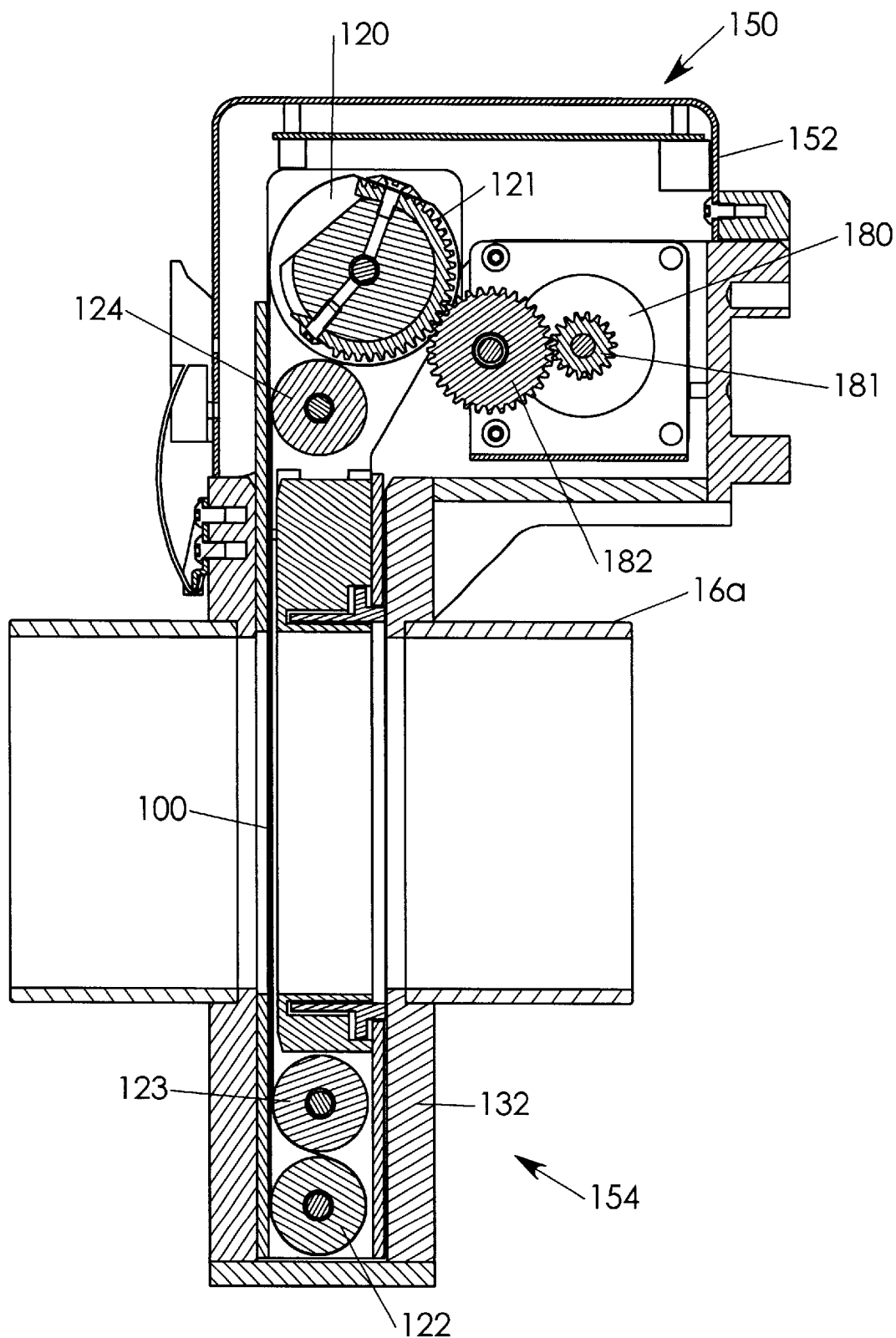
FIG. 7 is a cross sectional view of the embodiment of FIG. 6.

The preferred embodiment of the valve, valve cartridge, and housing of this invention, are shown in FIGS. 6 and 7.

Valve cartridge 130 is shown in FIG. 5, and can be slid into and out of lower housing portion 154 of valve cartridge housing 150, upon which cover 152 is hingedly mounted to allow selective access to the valve cartridge. Closure 162, received in receiving member 164, keeps cover 152 sealed against housing portion 154 when the valve is in operation. Pressure transducers 170 convert pressures to electrical signals used by the control system. The entire unit is mounted to a fluid-carrying duct (not shown) by means of duct portions 16a.

Figure 8:
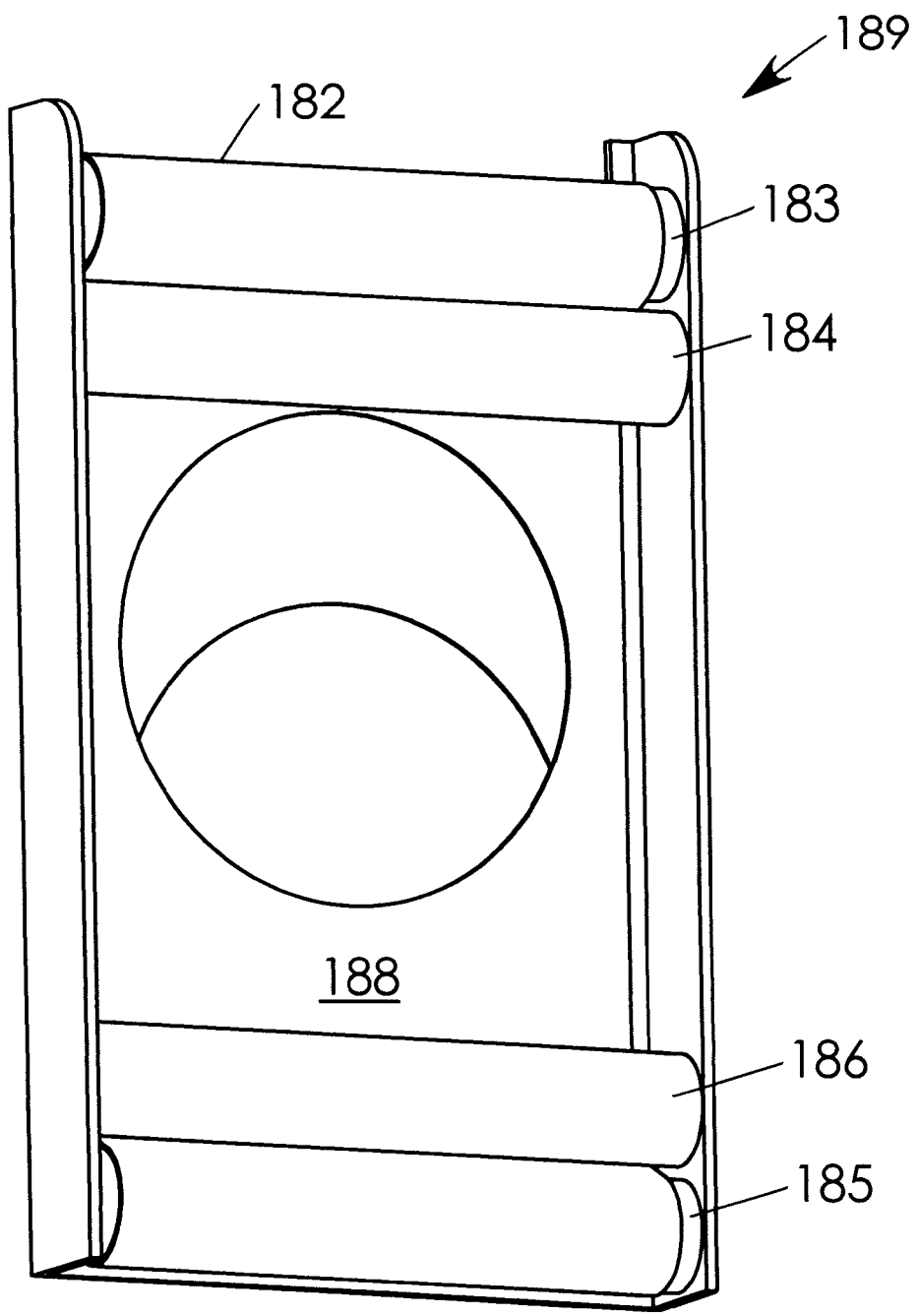
FIG. 8 is a rear view of an alternative valve cartridge.

Drive roller 120 carries teeth 121, which engage with the teeth of gear 182, which itself is driven by output gear 181 of drive motor 180. This positive drive allows (together with the use of a band position sensor, not shown) positive positioning of the band. In cases in which positive indexing is not required, the drive can be a simpler friction drive, which can allow the drive roller 182 (FIG. 8) to be smooth. Since in this embodiment the drive roller does not carry any drive means (e.g., teeth), it can turn through more of an angle than can roller 120, FIG. 7. Also shown in FIG. 8 are follower roll 185, idlers 184 and 186, and band 188 defining two circular openings, all of which are part of valve cartridge 189.

Figure 9A:
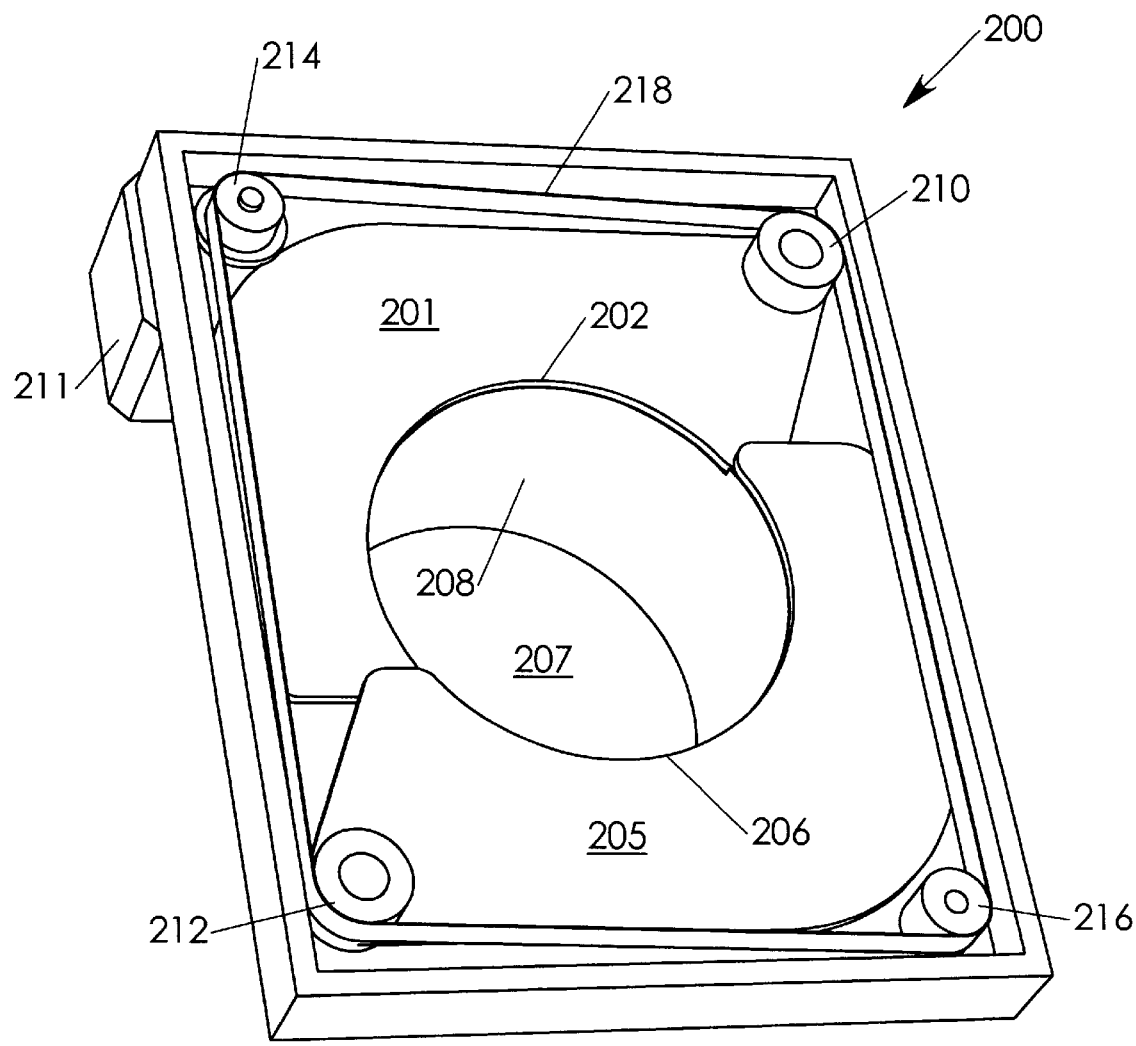
FIGS. 9A and 9B are schematic drawings of an embodiment of a variable orifice valve according to this invention using two vanes to accomplish the variable orifice.
Figure 9B:
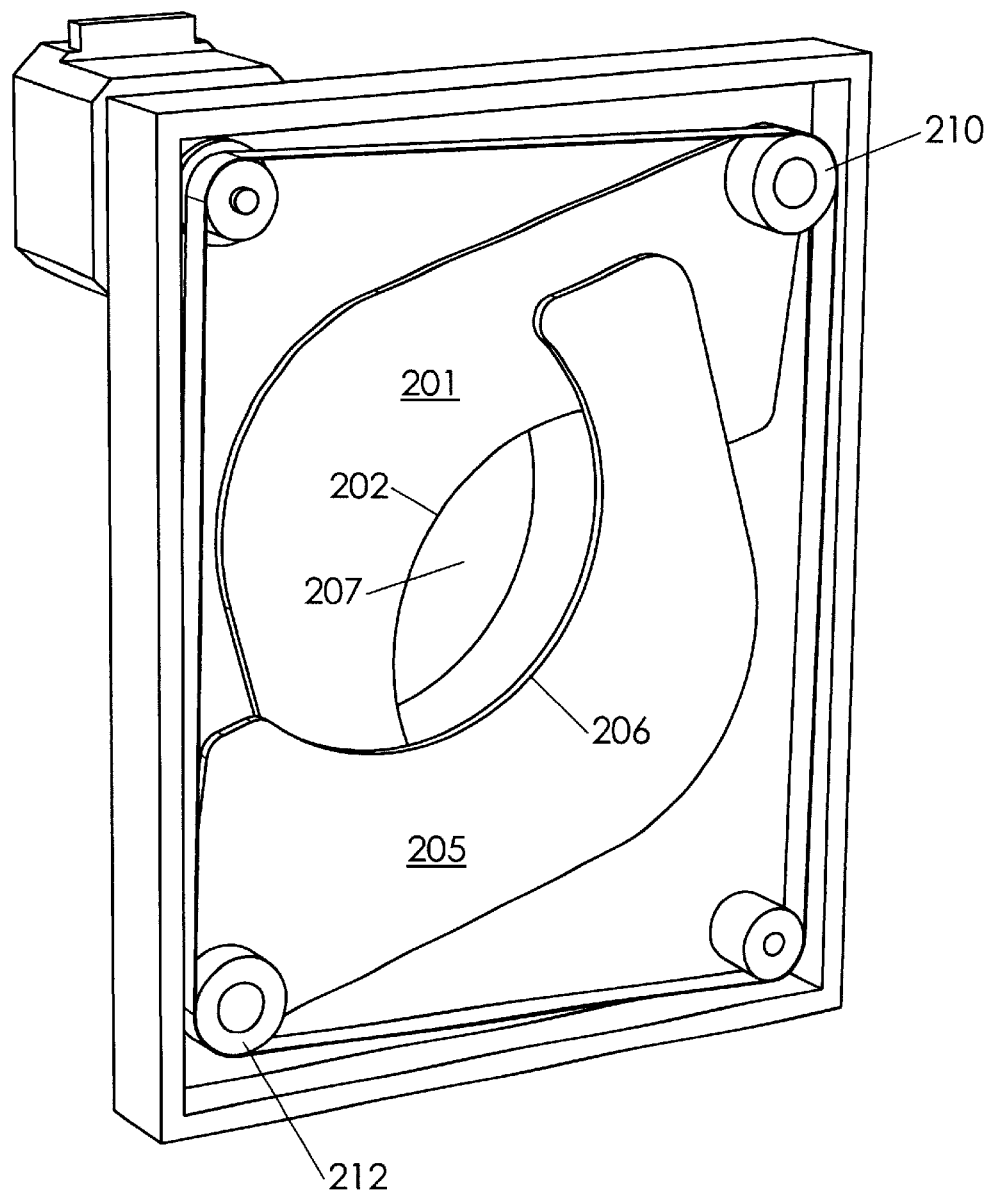

FIGS. 9A and 9B schematically depict an alternative valve cartridge 200 which employs valving vanes (movable members) 201 and 205, shown in the open position in FIG. 9A, and a partially closed position in FIG. 9B. Each of vanes 201 and 205 defines a semi-circular interior surface 202 and 206, respectively, which together define the orifice 207. The vanes pivot on pivot points 210 and 212, respectively, to properly adjust the orifice size.

There are any number of possible vane actuating drives for this embodiment. In this embodiment, drive belt 218 connects pivots 210 and 212, drive wheel 214 and idler 216, so that as drive wheel 214 is driven by a motor 211, the vanes move to adjust the orifice open area.

Figure 10A:
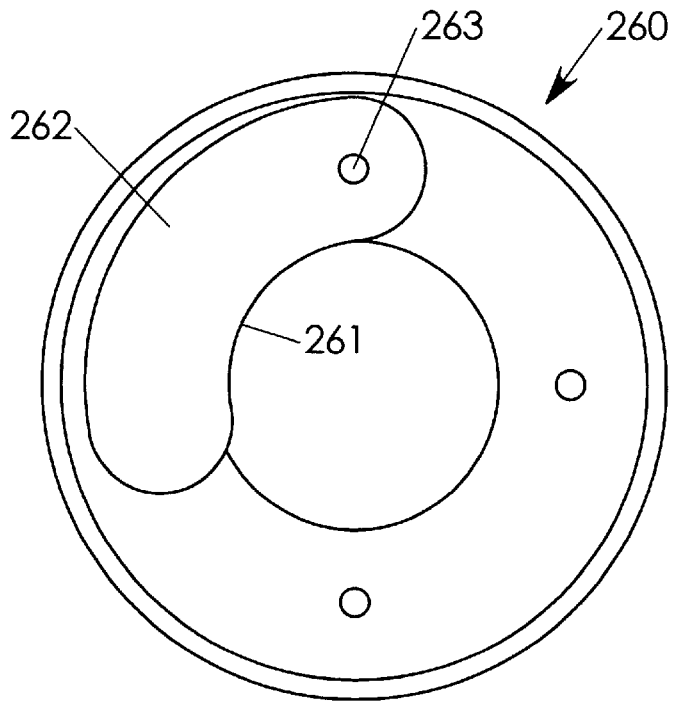
FIGS. 10A and 10B are similar schematic drawings of another manner of achieving a vane-type variable orifice valve of this invention, with four pivoting vanes, only one of the four vanes being shown in FIG. 10A for clarity purposes only.
Figure 10B:
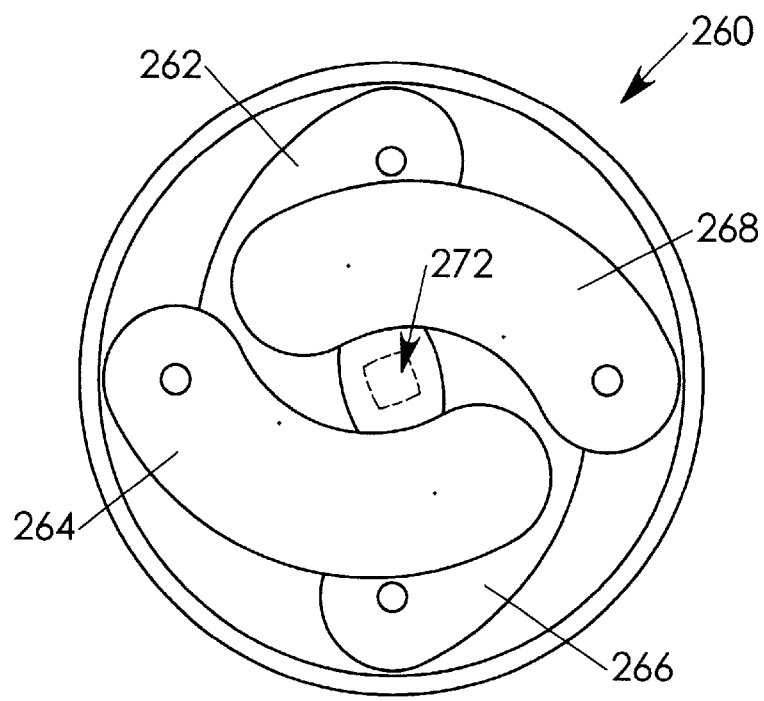

Another possible vane-type embodiment is shown in FIGS. 10A and 10B, in which four vanes 262, 264, 266, and 268, each pivot as shown (for example, vane 262 pivots about point 263). In this case, each vane defines a quarter-circular inner edge (one edge 261 labeled), so that together the vanes define a substantially circular orifice opening at the fully open position, and when closed define a small orifice 272. The valve types shown in FIGS. 9 and 10 can also be made as replaceable cartridges, with pinch roller or other appropriate drives.

Figure 11:
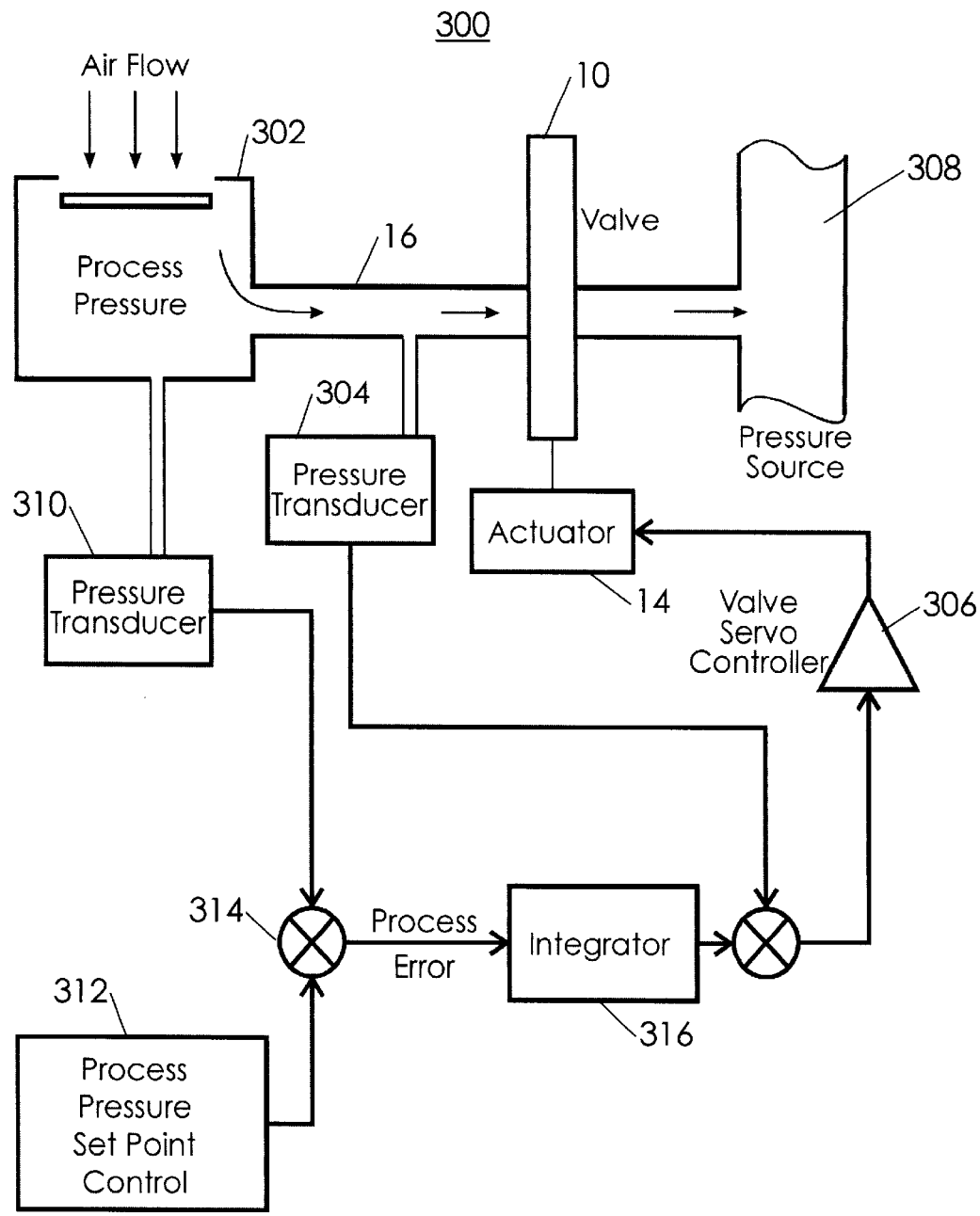
FIG. 11 is a schematic diagram of a vacuum control system using the valve of this invention.

Vacuum control system 300, FIG. 11, is an example of both a control system for the inventive valve, as well as an application of the inventive valve. Process chamber 302 (which may be a computer chip manufacturing process chamber, for example) is evacuated through duct 16 which leads to vacuum source 308. The variable orifice valve 10 of this invention is placed bisecting duct 16. Pressure transducers 304 and 310 measure the pressure in duct 16 and chamber 302, respectively. 312 is a process pressure set point control. Servo error 314 is integrated 316 and provided along with pressure 304 to valve servo controller 306 which drives valve actuator 14 to move the band to change the orifice size. This system allows the maintenance of a more constant vacuum, and thus a more constant air flow, within chamber 302, as pressure fluctuates in duct 16 (typically caused by fluctuations in vacuum source 308).

In one embodiment, the valve system includes Hall effect sensors or other band position sensors indicating when the valve is fully open and fully closed. Together with the drive motor controller, this allows the system to track the position of the valve band openings. Also, the pressure drop across the valve is measured. The pressure drop and valve position information allow a calculation of fluid flow rate through the valve and also allows the valve to be set to accomplish a particular flow rate.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A variable orifice air flow control system for maintaining a relatively constant air flow at a control location in a vacuum system, comprising:

means for establishing a pressure set point;

a variable orifice valve in the vacuum system, the valve having a movable band spanning the vacuum system, and defining an opening with an open area which is variable by movement of the band;

means for determining the pressure at two spaced locations of the vacuum system, a first location proximate the control location, and the second location proximate and upstream of the valve; and means, responsive to the pressure set point and the two determined pressures, for moving the band to drive the pressure at the first location toward the pressure set point.

2. A variable orifice valve for controlling fluid flow in a conduit, compring:

a band spanning the conduit, and defining two selectively overlapping openings, one opening downstream of and adjacent to the other opening, to define a fluid-passing opening;

a first roller outside of and on one side of the conduit;

a second roller outside of and on the other side of the conduit;

wherein the band is partially wrapped around both the first and second rollers;

an idler roller proximate each of the first and second rollers, each idler roller contacting the band; and means for moving the band relative to the conduit, to change the amount of the fluid-passing opening exposed to fluid flow in the conduit.

3. The valve of claim 2 in which said means for moving further includes means for rotating the first roller to change the relative positions of the openings.

4. The valve of claim 3 in which said means for rotating the first roller includes a drive motor which drives the periphery of the first roller.

5. The valve of claim 3 in which said means for rotating rotates the first roller so that any portion of the band which is located within the duct does not touch the first roller.

6. The valve of claim 2 in which said band has two ends, and both ends are fixed to the first roller.

7. The valve of claim 2 in which said band is essentially continuous, and is wrapped most of the way around each roller.

8. The valve of claim 2 in which said band includes a relatively stiff portion located in the conduit.

9. The valve of claim 8 in which said band further includes a relatively flexible portion located outside of the conduit.

10. The valve of claim 2 further including means for determining the fluid pressure in the conduit at a first location upstream of the movable members.

11. The valve of claim 10 in which said means for moving is responsive to said means for determining.

12. The valve of claim 11 further including means for sensing the fluid pressure at a second location upstream of the first location.

13. The valve of claim 12 further including means for establishing a fluid pressure set point.

14. The valve of claim 13 in which said means for moving is further responsive to the means for sensing and the means for establishing.

15. The valve of claim 2 in which said opening is generally circular.

16. The waiver of claim 2 in which the opening has approximately the same circumferential shape as the conduit.

17. The valve of claim 2 wherein each idler roller, the band, and the first and second rollers are all housed in a valve cartridge.

18. The valve of claim 17 further including a valve housing for removably holding the valve cartridge.

19. The valve of claim 18 in which the means for moving is movable relative to the valve housing, so that it can be disengaged from the valve cartridge.

20. A variable orifice valve for controlling fluid flow in a conduit, comprising:

a band spanning the conduit, and defining two selectively overlapping openings, one opening downstream of and adjacent to the other opening to define a fluid-passing opening;

a first roller outside of and on one side of the conduit;

a second roller outside of and on the other side of the conduit;

wherein the band is partially wrapped around both the first and second rollers; and means for moving the band relative to the conduit, to change the amount of the fluid-passing opening exposed to fluid flow in the conduit, wherein the portion of the band that is exposed within the conduit does not touch either of the rollers, to prevent transfer of contamination to the rollers.

21. A variable orifice valve for controlling fluid flow in a conduit, comprising:

a band spanning the conduit, and defining two selectively overlapping openings, one opening downstream of and adjacent to the other opening to define a fluid-passing opening;

a first roller outside of and on one side of the conduit;

a second roller outside of and on the other side of the conduit;

wherein the band is partially wrapped around both the first and second rollers, and wherein the portion of the band that contacts the rollers is more flexible than the portion of the band that is exposed within the conduit; and means for moving the band relative to the conduit, to change the amount of the fluid-passing opening exposed to fluid flow in the conduit.

* * * * *